US007822285B2

(12) United States Patent
Shan

(10) Patent No.: US 7,822,285 B2
(45) Date of Patent: Oct. 26, 2010

(54) METHODS AND SYSTEMS FOR LOCALLY ADAPTIVE IMAGE PROCESSING FILTERS

(75) Inventor: Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1135 days.

(21) Appl. No.: 10/850,831

(22) Filed: May 20, 2004

(65) Prior Publication Data
US 2005/0259886 A1 Nov. 24, 2005

(51) Int. Cl.
G06K 9/40 (2006.01)
G06K 9/38 (2006.01)
H04N 9/74 (2006.01)
H04N 1/40 (2006.01)

(52) U.S. Cl. .................. 382/260; 382/261; 382/262; 382/271; 382/272; 348/597; 358/448; 358/3.03

(58) Field of Classification Search .............. 382/260, 382/261, 262, 272, 274
See application file for complete search history.

(56) References Cited

U.S. PATENT DOCUMENTS

| 4,761,819 | A |   | 8/1988  | Denison et al. |          |
|-----------|---|---|---------|----------------|----------|
| 5,243,444 | A | * | 9/1993  | Fan            | 358/3.08 |
| 5,424,783 | A |   | 6/1995  | Wong           |          |
| 6,101,285 | A | * | 8/2000  | Fan            | 382/260  |
| 6,141,461 | A | * | 10/2000 | Carlini        | 382/261  |
| 6,236,763 | B1| * | 5/2001  | Wong et al.    | 382/261  |
| 6,631,206 | B1|   | 10/2003 | Cheng et al.   |          |
| 6,711,302 | B1| * | 3/2004  | Lee            | 382/275  |
| 6,721,458 | B1| * | 4/2004  | Ancin          | 382/261  |
| 6,731,821 | B1| * | 5/2004  | Maurer et al.  | 382/263  |
| 7,146,059 | B1| * | 12/2006 | Durand et al.  | 382/260  |
| 7,352,911 | B2| * | 4/2008  | Maurer         | 382/260  |
| 7,403,568 | B2| * | 7/2008  | Dumitras et al.| 375/240.29|
| 7,430,334 | B2| * | 9/2008  | Keshet et al.  | 382/260  |
| 2004/0071363 | A1 | * | 4/2004 | Kouri et al. | 382/276 |

FOREIGN PATENT DOCUMENTS

EP   1289309 A   3/2003

(Continued)

OTHER PUBLICATIONS

Durand et al., "Fast Bilateral Filtering for the Display of High-Dynamic-Range Images", ACM Siggraph, ACM Transactions on Graphics, pp. 257-266, Jul. 2002.*

(Continued)

Primary Examiner—Matthew C Bella
Assistant Examiner—Jose M Torres
(74) Attorney, Agent, or Firm—Blakely, Sokoloff Taylor & Zafman LLP

(57) ABSTRACT

The present disclosure provides methods and systems for image processing by locally adaptive filters that preserve the edges while smoothing the image. In the exemplary method, a filter adjusts image pixel values utilizing a locally adaptive weighted average method. To adjust the value of a target pixel, the filter uses the data corresponding to some of its surrounding pixels and modifies the weights in an inverse relation with both their distance from the target pixel and the difference between their data. Various embodiments present different schemes for selection of surrounding pixels and computation of weighted average values.

25 Claims, 8 Drawing Sheets

FOREIGN PATENT DOCUMENTS

WO     WO 00/73993 A     12/2000

OTHER PUBLICATIONS

Tomasi et al., "Bilateral Filtering for Gray and Color Images", Computer Vision, 1998. IEEE Sixth International Conference on Jan. 4-7, 1998 pp. 839-846.*

Elad, "On the Origin of the Bilateral Filter and Ways to Improve It", IEEE Transactions on Image Processing, vol. 11, No. 10, Oct. 2002, pp. 1141-1151.*

European Search Report, Application No. EP05251956, dated Aug. 9, 2005.

* cited by examiner ptions such as noise suppression, data compaction, and feature enhancement. A filter may be a physical object such as an electrical or electronic circuit on a signal's path, or a set of mathematical manipulations performed on different aspects of a signal such as its magnitude or phase, or it may be any other (usually nonrandom) operation performed on a signal.

METHODS AND SYSTEMS FOR LOCALLY ADAPTIVE IMAGE PROCESSING FILTERS

TECHNICAL FIELD

The present invention relates to signal processing and, more particularly, to image processing, smoothing, and enhancement.

BACKGROUND

"Filtering" is one of the most basic operations in the field of signal processing. Through filtering, various operations are performed on either analog or digital signals to achieve results such as noise suppression, data compaction, and feature enhancement. A filter may be a physical object such as an electrical or electronic circuit on a signal's path, or a set of mathematical manipulations performed on different aspects of a signal such as its magnitude or phase, or it may be any other (usually nonrandom) operation performed on a signal.

One branch of signal processing is image processing. A digital image is a collection of points with different brightness and colors, called pixels, which are of finite physical dimensions. To store or transmit images, the data corresponding to each pixel represents the pixel's color, brightness, luminance, and other information associated with the pixel. This image data is susceptible to corruption and noise as a result of data transmission, physical limitations of image capturing and storing devices, electromagnetic interference, etc. To compensate for damage caused to the image data and consequent image degradation, and to reduce the noise and smooth the corrupted image, or merely to enhance the image and emphasize its features, it may be desirable to perform some operations on an image through filtering.

Some traditional but more complicated and often computationally more demanding operations involve transformation of the image data into other domains, such as the Fourier, Hankel, or Hilbert domains, and an inverse transformation to the image domain subsequent to some manipulations in the new domains. Other traditional methods involve mathematical manipulations in the same domain as the image domain. A typical example of the latter methods is to adjust each pixel data using the data corresponding to its neighboring pixels. The selection criteria for choosing the neighboring pixels and the computational scheme for adjustment of a target pixel's data are some of the distinguishing attributes of a filter.

A number of more popular filters calculate some variations of a weighted average value of a pixel and its neighbors. In these filters the value of the pixel data to be adjusted (target pixel), and its neighbors' data, is usually multiplied by fixed numbers (weights), and the average value of the resulting multiplications is used to adjust the target pixel. In effect the image is "convolved" with a two-dimensional window of multipliers.

In an image, apart from exceptional cases, there is a high probability that the value of each pixel data is close to the values of its neighbors. Accordingly, an averaging scheme such as the one described above reduces the corrupting effect of noise by bringing a noise-affected pixel's value closer to the values of its neighbors. However, while averaging schemes "smooth" the image by suppressing noise, they blur the "edges" of any object within the image by preventing any sudden change in pixel values and replacing sudden changes by gradual ones.

A need exists for relatively simple yet adaptable filters, which can adjust their weights based on the local necessities of an image and preserve the edges and the image sharpness while enhancing the image and reducing the noise.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein.

DETAILED DESCRIPTION

The present invention relates to locally adaptive nonlinear filtering methods and systems for noise suppression, noise reduction, and smoothing of an image while preserving the "edges." The filters described in the present invention—in order to calculate the weighted average—not only take into account the geometric position of a target pixel relative to its surrounding pixels, but also the relation of their corresponding data. In the following description, several specific details are presented to provide a thorough understanding of the embodiments of the invention. One skilled in the relevant art will recognize, however, that the invention can be practiced without one or more of the specific details, or in combination with or with other components, etc. In other instances, well-known implementations or operations are not shown or described in detail to avoid obscuring aspects of various embodiments of the invention.

Reference throughout the specification to "one embodiment" or "an embodiment" means that a particular feature, structure, implementation, or characteristic described in connection with the embodiment is included in at least one embodiment of the present invention. Thus, the appearances of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
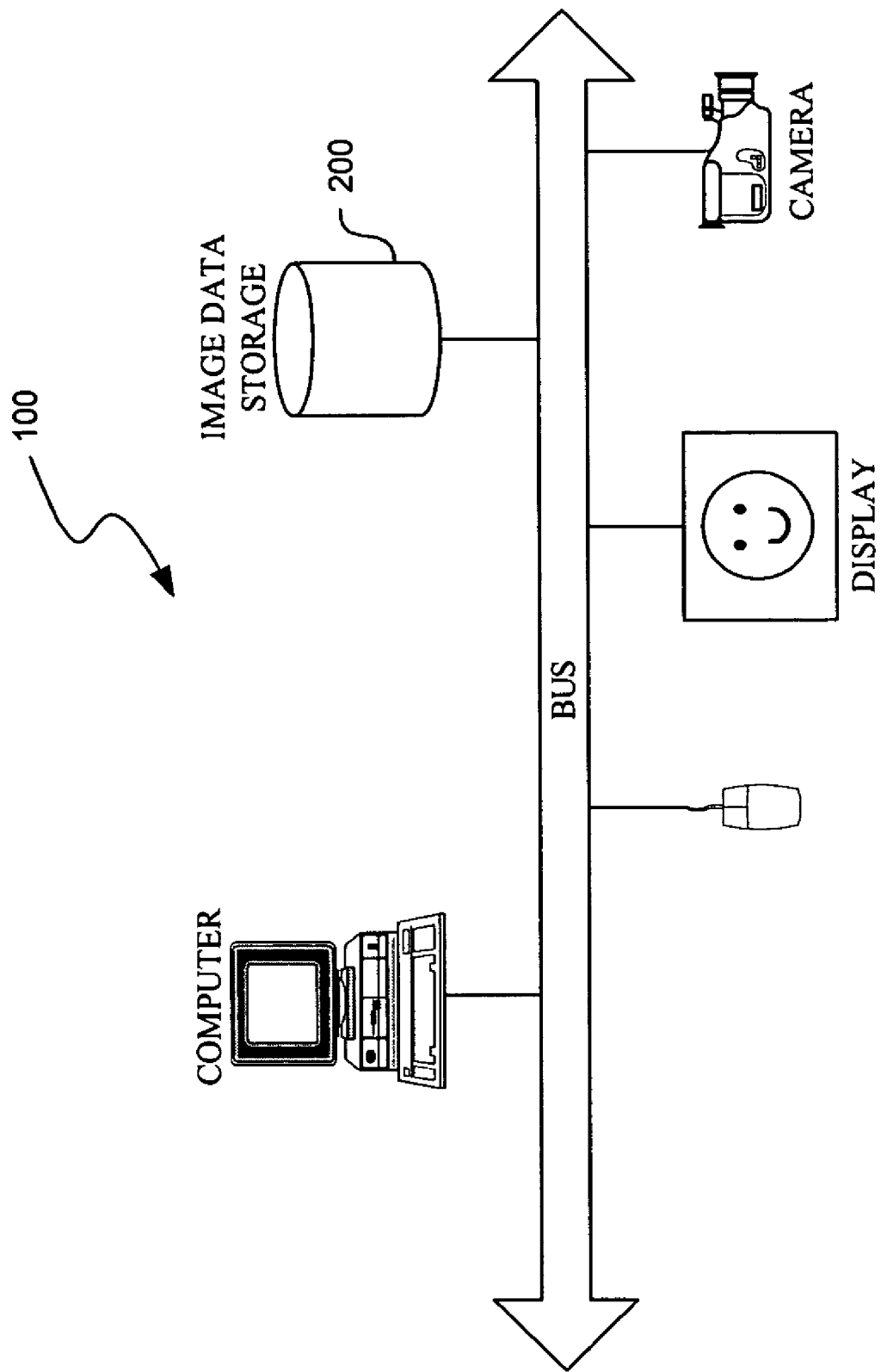
FIG. 1 is a schematic diagram of a typical imaging environment.
Figure 2:
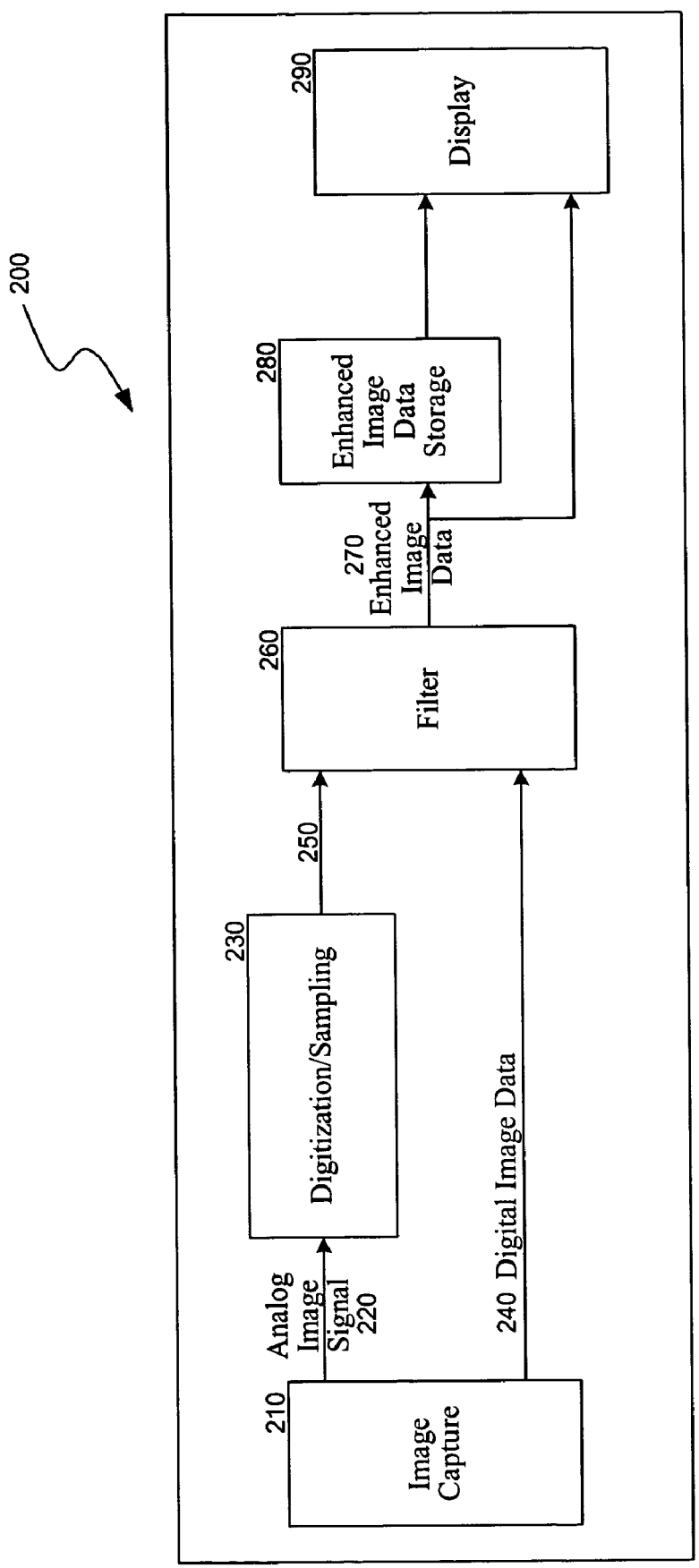
FIG. 2 is a schematic diagram of a typical image data path.

FIG. 1 is a schematic diagram of a typical imaging environment, which also includes image processing. FIG. 2 is the schematic diagram of an embodiment of the Locally Adaptive Nonlinear Filter (LANF) system, and additionally represents the simplified data path of an image within the imaging environment of FIG. 1. The image device 210 is an image capturing device, an image generating device, a storage device, or any other device capable of outputting image signal or data in either analog or digital form, or both. The digital output 240 of the image device 210 is an input to the LANF filter 260. If the output of the image device 210 is analog, it will go through the digitizing or sampling device 230 and the digitized signal (image data) 250 will be inputted to the LANF filter 260. The filtered signal 270 may either be stored in the data storage 280 or displayed by display device 290. Filter 260 can be any processing unit, such as a special purpose processor or a desktop computer, capable of performing specific mathematical operations on the data.

Figure 3:
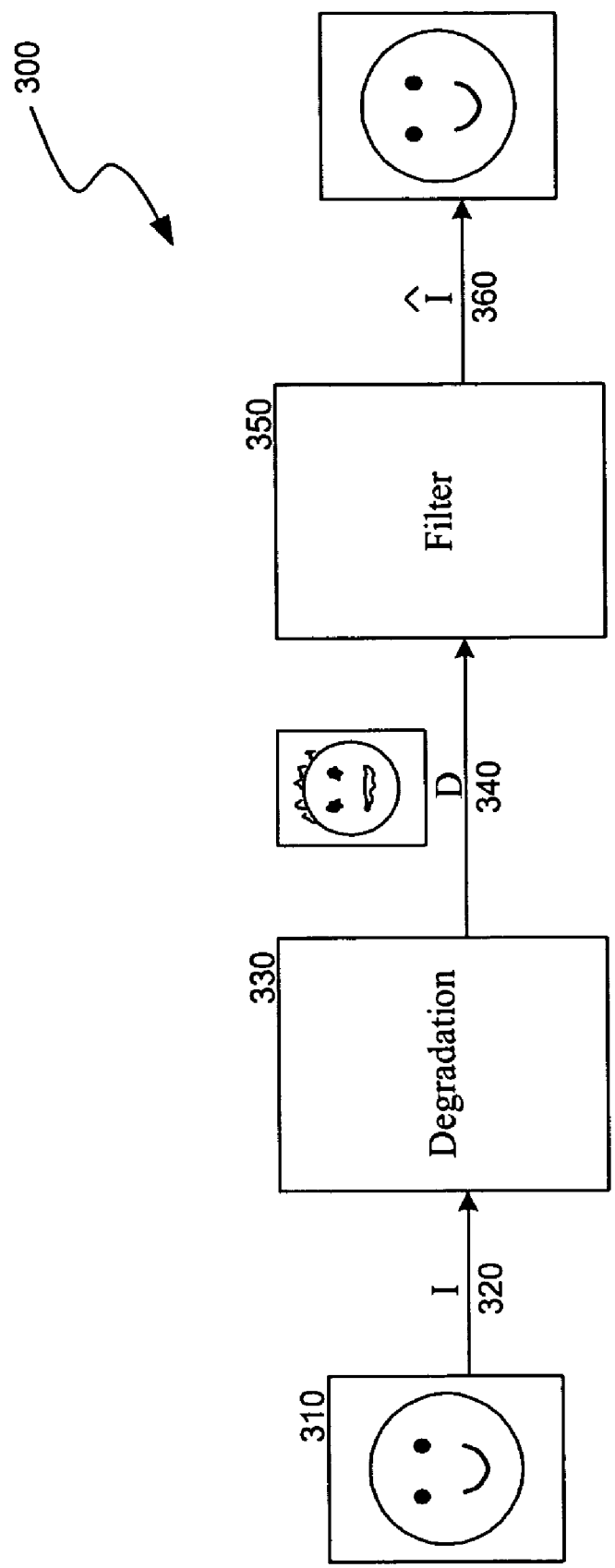
FIG. 3 is a schematic diagram of the degradation and filtering effects.

FIG. 3 schematically illustrates the degradation and filtering process of an image. The image data I, 320, representing image 310, is corrupted by the addition of noise (N), 330, in a number of possible ways, resulting in degraded image data D, 340, where D =I +N. The filtering process on the degraded image D, by filter 350, will reduce the effect of noise and will result in high fidelity image $\hat{I}$, 360.

Figure 4:
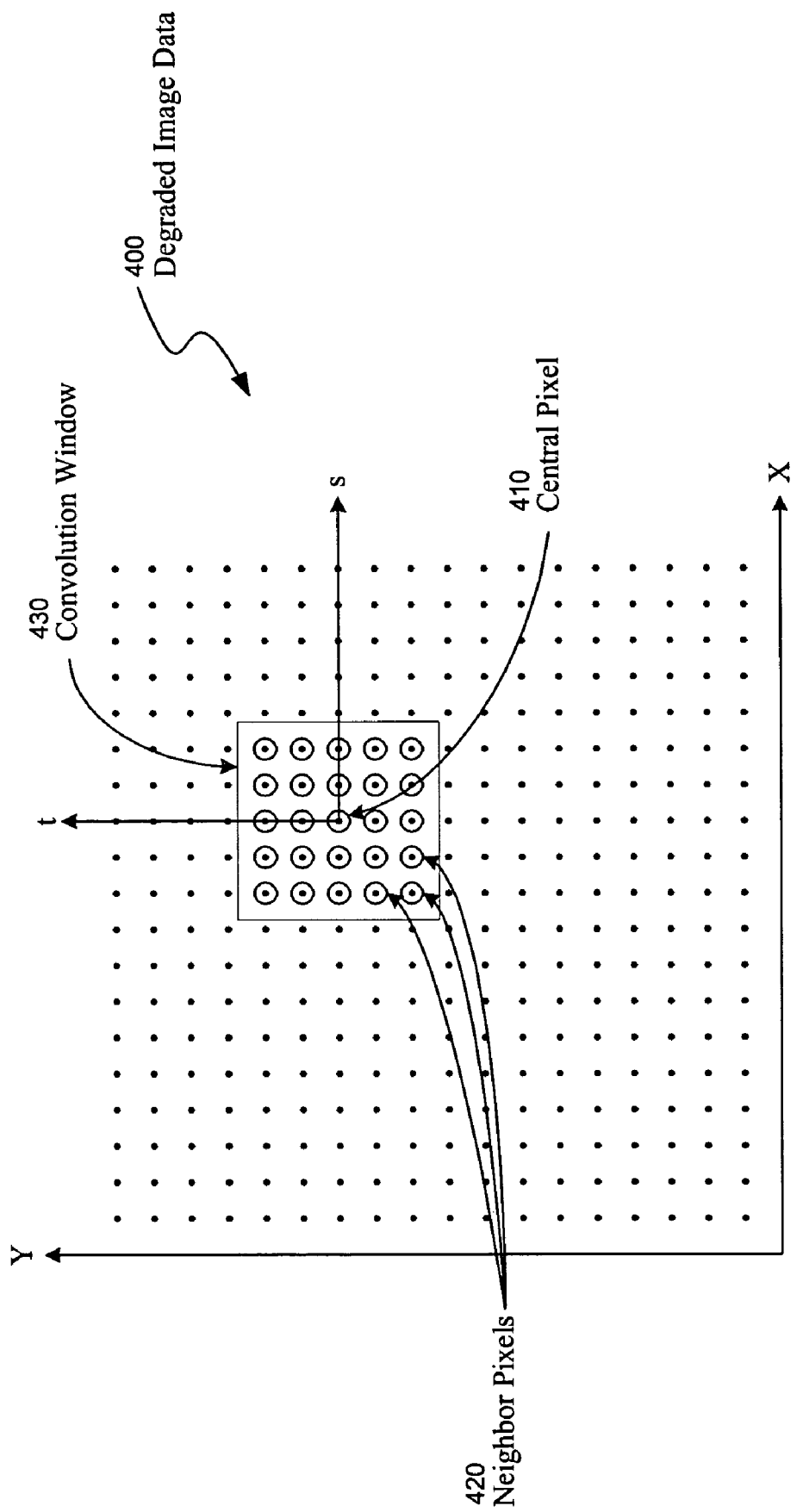
FIG. 4 is a schematic diagram of an embodiment of the filtering scheme in accordance with the present invention.

FIG. 4 is a schematic diagram of the degraded image data 400 (D) and illustrates one embodiment of the filtering method in accordance with the present invention. The "central pixel" 410 is a target pixel, and its corresponding data will be adjusted by the filter using its own data and the data of a limited number of its surrounding pixels 420. A central pixel and those surrounding pixels whose data is included in the adjustment computations of the central pixel are said to be within a "convolution window" 430. In one embodiment the "adjustment" of a pixel may be performed by replacing its data with other computed data, and in another embodiment an "adjustment" may mean adding, subtracting, or multiplying the pixel data by a number, and yet in another embodiment an adjustment may mean other operations on the pixel data.

In one embodiment, the computations for each central pixel are as follows:

$$\hat{I}(x, y) = \frac{\sum_s \sum_t w(s, t, x, y) D(x+s, y+t)}{\sum_s \sum_t w(s, t, x, y)}$$

where the weights (w) are computed by the following equations:

$$w(s, t, x, y) = w_P(s, t) w_R(s, t, x, y)$$

$$w_P(s, t) = e^{-\ln 2 \frac{s^2+t^2}{s^2}}$$

$$w_R(s, t, x, y) = \frac{1}{1 + \alpha(D(x+s, y+t) - D(x, y))^2}$$

In the above equations x and y are the coordinates of each pixel within the image frame and s and t are the relative coordinates of the surrounding pixels 420 with respect to the central pixel 410. D(x,y) represents the pixel data at the x and y coordinates, and σ is a constant. The weight assigned to each pixel within the convolution window 430, w(s,t,x,y), is composed of two components, $w_p(s,t)$ and $w_R(s,t,x,y)$. The first component $w_p(s,t)$ is inversely related to the distance between a neighbor pixel and the central pixel. Therefore, the farther a pixel is from the central pixel, the less it influences the adjustment of the central pixel. The second component $w_R(s,t,x,y)$ is inversely related to the difference between the central pixel data and the surrounding pixel data. The larger the difference is, the less the influence of a surrounding pixel data on the adjustment of the central pixel data.

Figure 5:
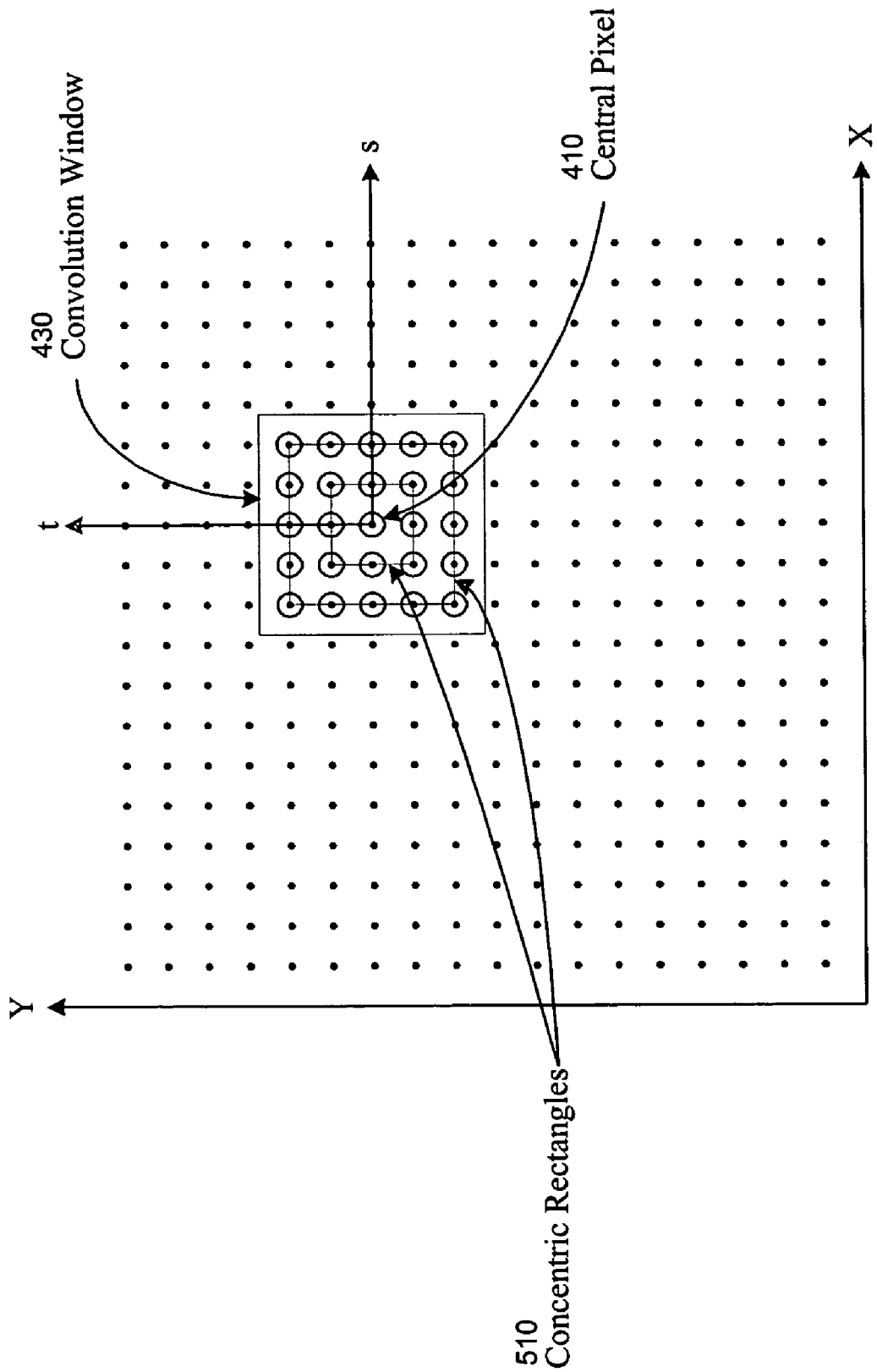
FIG. 5 is a schematic diagram of another embodiment of the filtering scheme in accordance with the present invention.

FIG. 5 illustrates another embodiment of the present invention. In this embodiment the pixels within the convolution window are considered to be formed concentric rectangles 510, with the central pixel at their common center. In this embodiment the computations are iterative. The number of iterations for adjustment of the central pixel data is equal to the number of concentric rectangles within the convolution window. Iterations may utilize the same equations mentioned above.

Each iteration utilizes only the previously adjusted central pixel data and the data of the pixels forming one of the concentric rectangles. The adjusted data of the central pixel will then be used in the subsequent iteration until the concentric rectangles are exhausted. This process is repeated for all concentric rectangles, each time using the previously adjusted value of the central pixel. Although this embodiment slightly increases the computational load of LANF, it has an increased smoothing effect on the image. The iterations may start with the most inner rectangle and end with the most outer one, or vise versa or even in no particular order.

Figure 6:
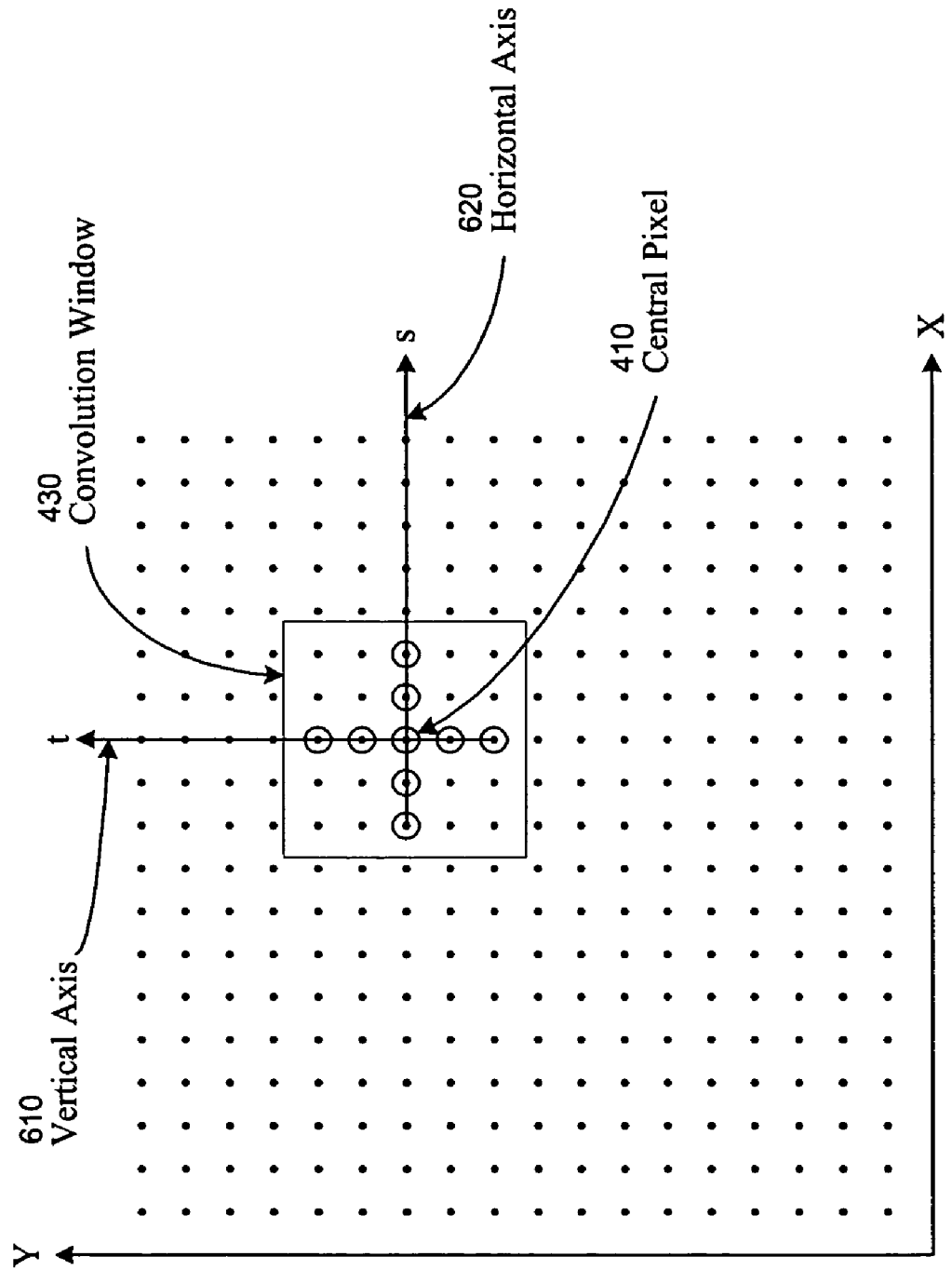
FIG. 6 is the schematic diagram of yet another embodiment which in two iterations adjusts the central pixel using the data of the surrounding pixels situated on two perpendicular axis parallel to the x-y axis of the image, and passing through the central pixel.

FIG. 6 is the schematic diagram of yet another embodiment that in two iterations adjusts the central pixel 410 using the data of the surrounding pixels situated on two perpendicular axes passing through the central pixel. In some implementations these perpendicular axis may be parallel to the X and Y axis. Here, for brevity, an axis parallel to the X axis is called the horizontal axis and the one parallel to the Y axis is called the vertical axis. In the first iteration of adjusting a target pixel, the data of the target pixel (central pixel) and the pixels on one of the axis (either vertical axis 610 or horizontal axis 620) within the convolution window 430, is utilized. In the second iteration, the central pixel is readjusted using its first iteration adjusted data and the data of the pixels within the convolution window 430, on the other axis.

Figure 7:
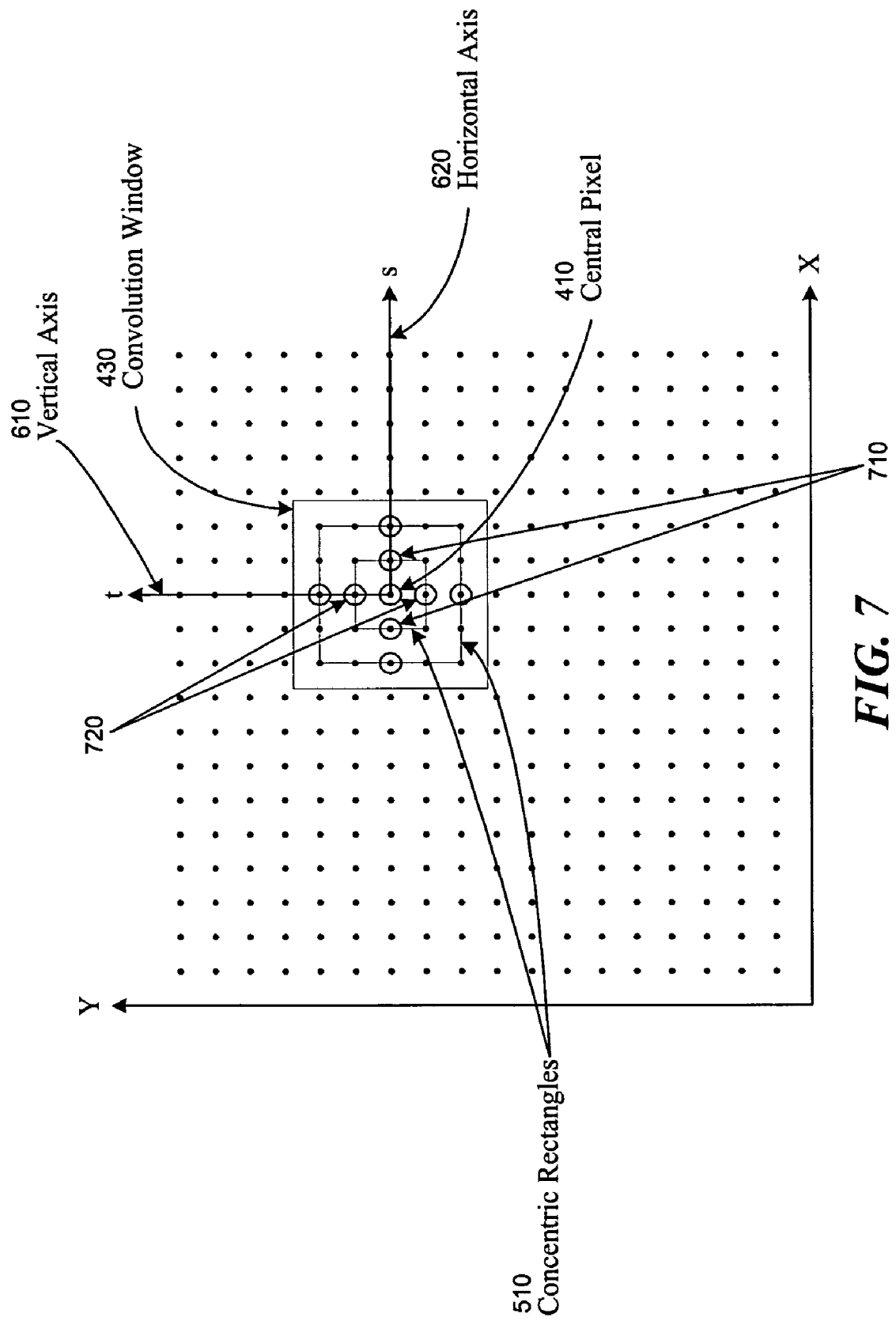
FIG. 7 is the schematic diagram of yet another embodiment, which combines the implementations of the two previous embodiments

FIG. 7 is the schematic diagram of yet another embodiment, which combines the implementations of the two previous embodiments in FIGS. 5 and 6. In this embodiment only the pixels situated on the cross section of vertical axis 610 and horizontal axis 620 and the concentric rectangles 510 within the convolution window are used for adjustment of the central pixel data. In this embodiment the number of iterations is twice as many as the number of concentric rectangles 510. Iterations may utilize the same equations mentioned above.

For each concentric rectangle there are two iterations. In the first iteration of a concentric rectangle, the central pixel data and the data of the two pixels at the cross section of the horizontal, 710, or the vertical axis, 720, with the concentric rectangle are used to adjust the central pixel data. In the second iteration of the same concentric rectangle, the adjusted central pixel data of the previous iteration is used along with the data of the two pixels at the cross section of the other axis and the concentric rectangle. For each concentric rectangle computation, the adjusted data of the central pixel after the second iteration will become the central pixel data for the computations of the first iteration of the subsequent concentric rectangle. Iterations continue until all the pixels at the cross sections of the horizontal and the vertical axis 610 and 620 with the concentric rectangles within the convolution window have been considered. In yet another embodiment, the iterations start with the most inner concentric rectangle and end with the most outer one or vice versa.

For color images there are several different ways to describe color, known as color spaces. Many color spaces are used in the world today. Two of the well-known standard color spaces are RGB and YUV. In the RGB color space, combining Red, Green, and Blue in different ratios makes up all colors. In the YUV color space, the luminance (similar to brightness) of the image is isolated from the color information and is retained in the "Y" channel separately from chrominance (color). The "U" and "V" channels carry color information. Most of the information about the "edges" and details are presented in the "Y" channel.

In yet another embodiment, YUV is the processing domain. While traditional filters such as the Gaussian Filter may be applied to the U and V channel data, the above-mentioned filter implementations can be applied to the Y channel of a YUV color space.

Figure 8:
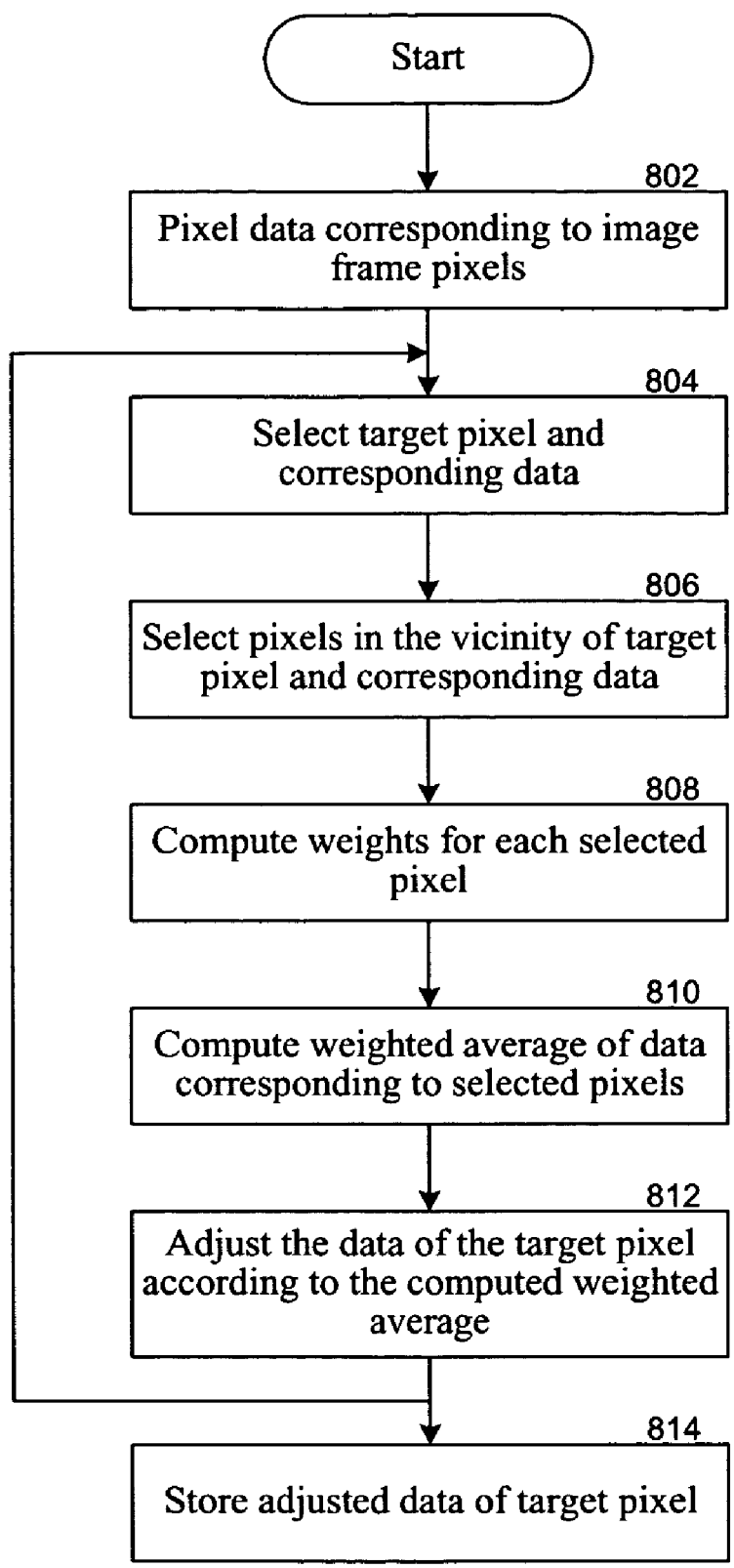
FIG. 8 is the flow diagram of the Locally Adaptive Nonlinear Filtering method according to an embodiment of this invention.

FIG. 8 is the flow diagram of the Locally Adaptive Nonlinear Filtering method according to an embodiment of this invention. The input to the method at step 802 is the pixel data associated with the pixels in an image pixel frame. In one embodiment the step 802 may be pixel data stored in a memory module and in another embodiment it may be real time data from a camera, etc.

At step 804 a target pixel is selected and its corresponding data is identified to be later adjusted. At step 806, some of the pixels in the vicinity of the target pixel are selected—according to the selection criteria in an aforementioned embodiment of the invention—and their corresponding data is identified. This data is to be later used to adjust the target pixel data. At step 808 a weight is computed for each of the selected pixels in the vicinity of the target pixel. These computations employ some of the previously furnished equations.

At step 810, the data of the target pixel, along with the data of the other pixels selected within the vicinity of the target pixel, and the computed weights, are used to compute a weighted average in accordance with another of the previously furnished equations. At step 812 the weighted average computed in step 810 is utilized to adjust the data of the target pixel identified in step 804. At step 814 the adjusted data of the target pixel is stored and the process of pixel adjustment is repeated until all or part of the image frame is filtered.

The preferred and several alternate embodiments have thus been described. One of ordinary skill after reading the foregoing specification will be able to effect various changes, alterations, combinations, and substitutions of equivalents without departing from the broad concepts disclosed. It is therefore intended that the scope of the letters patent granted hereon be limited only by the definitions contained in appended claims and equivalents thereof, and not by limitations of the embodiments described herein.

I claim:

1. A method for causing a processor to process an image frame of pixel data, the image including a plurality of pixels and the pixel data corresponding to the pixels, the method comprising:
    selecting a first pixel;
    selecting a plurality of second pixels in the vicinity of the first pixel;
    computing a weighted average value of the pixel data corresponding to the selected pixels such that the weight associated with each selected pixel comprises a combination of a first weight inversely related to that pixel's distance from the first pixel and a second weight inversely related to the difference between that pixel's data and the first pixel's data; and
    adjusting the first pixel data according to the computed weighted average, wherein the first pixel data is adjusted by a series of iterations each of which utilizes the previously adjusted data of the first pixel and the data of two pixels situated at the cross section of one of two perpendicular axes passing through the first pixel and a rectangle with the first pixel at its center.

2. The method of claim 1, wherein pixel data is the luminance value of the pixel.

3. The method of claim 1, wherein pixel data is the brightness value of the pixel.

4. The method of claim 1, wherein the image is a still image.

5. The method of claim 1, wherein the image is a single frame of a video.

6. The method of claim 1, wherein the image is a single frame of a movie.

7. The method of claim 1, wherein all the pixels within a rectangle of finite dimensions, at the center of which the first pixel is located, are selected.

8. The method of claim 1, wherein the weight associated with each selected pixel results from multiplication of the first weight and the second weight.

9. The method of claim 1, wherein the weight associated with each selected pixel results from multiplication of a first weight inversely related to the square of that pixel's distance from the first pixel and a second weight inversely related to the square of the difference between that pixel's data and the first pixel data.

10. The method of claim 1, wherein the weight associated with each selected pixel results from multiplication of a first weight inversely related to that pixel's distance from the first pixel and a second weight inversely related to the relative proportion of that pixel's data and the first pixel data.

11. The method of claim 1, wherein the image data is the "Y" channel data of a YUV color space.

12. A system for processing an image frame of pixel data, the image including a plurality of pixels and the pixel data corresponding to the pixels, the system comprising:
    a memory unit for storing image pixel data; and
    a programmable processor, the processor being programmed to:
        select a first pixel data;
        select a plurality of second pixels in the vicinity of the first pixel;
        compute a weighted average value of the pixel data corresponding to the selected pixels such that the weight associated with each selected pixel comprises a combination of a first weight inversely related to that pixel's distance from the first pixel and a second weight inversely related to the difference between that pixel's data and the first pixel's data; and
        adjust the first pixel data according to the computed weighted average, wherein the first pixel data is adjusted by a series of iterations each of which utilizes the previously adjusted data of the first pixel and the data of two pixels situated at the cross section of one of two perpendicular axes passing through the first pixel and a rectangle with the first pixel at its center.

13. The system of claim 12, wherein pixel data is the luminance value of the pixel.

14. The system of claim 12, wherein pixel data is the brightness value of the pixel.

15. The system of claim 12, wherein the image is a still image.

16. The system of claim 12, wherein the image is a single frame of a video.

17. The system of claim 12, wherein the image is a single frame of a movie.

18. The system of claim 12, wherein all the pixels within a rectangle of finite dimensions, at the center of which the first pixel is located, are selected.

19. The system of claim 12, wherein the weight associated with each selected pixel results from multiplication of the first weight and the second weight.

20. The system of claim 12, wherein the weight associated with each selected pixel results from multiplication of a first weight inversely related to the square of that pixel's distance from the first pixel and a second weight inversely related to the square of the difference between that pixel's data and the first pixel data.

21. The system of claim 12, wherein the weight associated with each selected pixel results from multiplication of a first weight inversely related to that pixel's distance from the first pixel and a second weight inversely related to the relative proportion of that pixel's data and the first pixel data.

22. The system of claim 12, wherein the image data is the "Y" channel data of a YUV color space.

23. A method for causing a processor to process an image frame of pixel data, the image including a plurality of pixels and the pixel data corresponding to the pixels, the method comprising:

selecting a first pixel;

selecting a plurality of second pixels in the vicinity of the first pixel;

computing a weighted average value of the pixel data corresponding to the selected pixels such that the weight associated with each selected pixel comprises a combination of a first weight inversely related to that pixel's distance from the first pixel and a second weight inversely related to the difference between that pixel's data and the first pixel's data; and adjusting the first pixel data according to the computed weighted average, wherein the first pixel data is adjusted iteratively by a process including:

performing an iteration that uses the first pixel and the data of two pixels situated at the intersection of one of two perpendicular axes passing through the first pixel with a first rectangle having the first pixel at its center; and performing one or more additional iterations, wherein each additional iteration uses adjusted first pixel data from the previous iteration and the data of two pixels situated at the intersection of one of two perpendicular axes passing through the first pixel with an additional rectangle having the first pixel at its center, and wherein each additional rectangle is different than any previous rectangle.

24. The method of claim 23 wherein each additional rectangle is larger than any previous rectangle.

25. The method of claim 23 wherein each additional rectangle is smaller than any previous rectangle.

* * * * *